May 12, 1953

B. E. DAVIS ET AL 2,638,018

SAW SHARPENER

Filed April 24, 1951

Bruce E. Davis
Howard Mabe
INVENTORS.

BY
*Clarence A. O'Brien*
*and Harvey B. Jackson*
Attorneys

May 12, 1953  B. E. DAVIS ET AL  2,638,018
SAW SHARPENER
Filed April 24, 1951  2 Sheets-Sheet 2
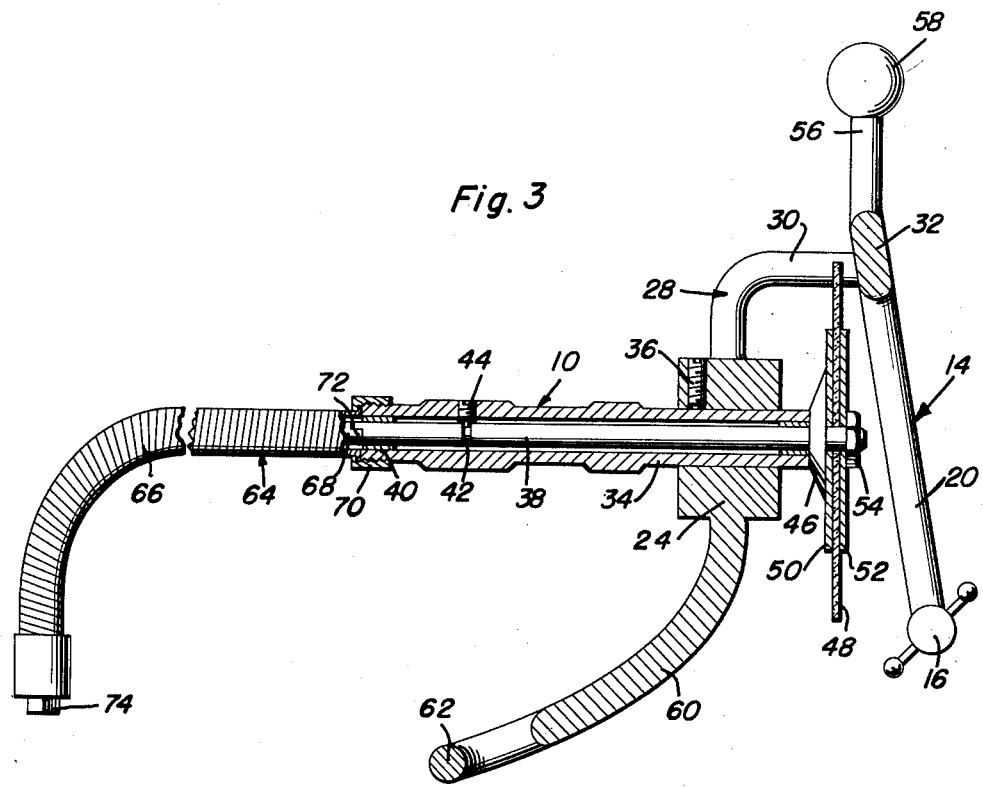
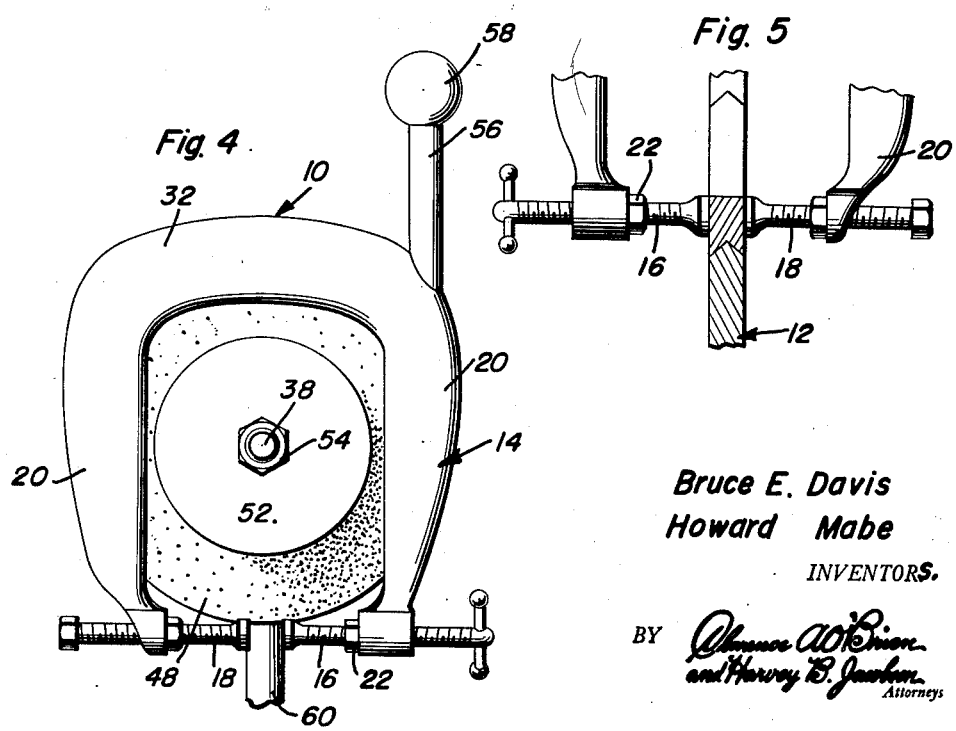
Bruce E. Davis
Howard Mabe
INVENTORS.

Patented May 12, 1953

2,638,018

UNITED STATES PATENT OFFICE 2,638,018

SAW SHARPENER

Bruce E. Davis, Rising Sun, Md., and
Howard Mabe, Peach Bottom, Pa.

Application April 24, 1951, Serial No. 222,714

5 Claims. (Cl. 76—37)

This invention comprises novel and useful improvements in saw sharpening devices.

An important object of this invention is to provide a saw sharpening device of the rotary type which may be utilized in sharpening and gumming saws, which sharpening device is guidably mounted on the saw blade.

Another object of this invention is to provide a saw sharpening device, in accordance with the foregoing object, in which the mechanism for guiding the sharpening device on the saw blade also serves as a protective guard for the rotary abrading element.

An important feature of this invention resides in the provision of a yoke having inwardly directed adjustable guide fingers on the leg portions thereof, a spindle supporting hub attached to the yoke by a pair of L-shaped arms, a spindle journaled in the hub and an abrading element carried by the spindle between the yoke and the hub.

Another feature of this invention resides in the provision of a sharpening device, in accordance with the foregoing feature, in which one handle extends laterally from the web portion of the yoke and in which a second handle is carried by the spindle supporting hub and extends therefrom.

A further feature of this invention resides in the provision of a sharpening device, in accordance with the foregoing features in which the spindle is driven by a flexible drive cable coupled thereto, which cable extends through a flexible sheath which is non-rotatably attached to the spindle supporting hub.

These, together with various ancillary objects and features are attained by this device, a preferred embodiment of which has been illustrated in the accompanying drawings wherein:

Figure 3 is a longitudinal sectional view of the sharpening device, taken on the plane 3—3 of Figure 1;

Figure 4 is a front elevational view of the sharpening device; and

Figure 5 is a fragmentary sectional view taken on the plane 5—5 of Figure 2.

Figure 1:
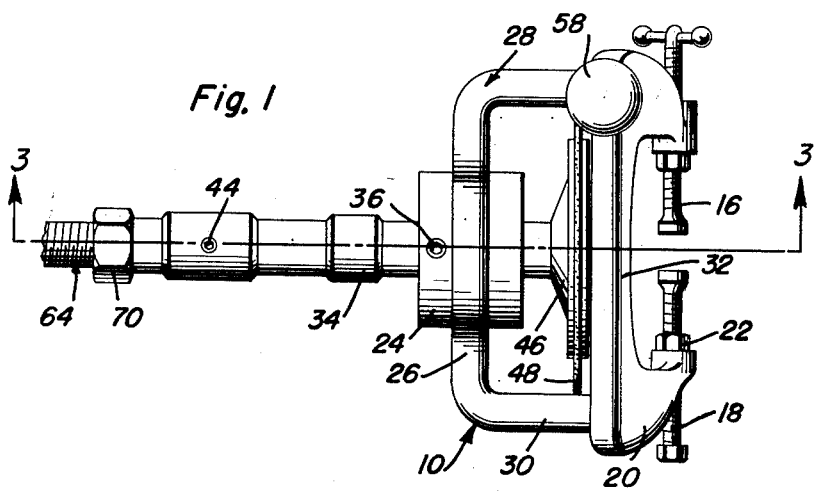
Figure 1 is a top plan view of the sharpening device.

Reference is now made more specifically to the accompanying drawings wherein the saw sharpening device, indicated generally by the numeral 10 is shown applied to a saw blade 12 which may be of the conventional insertable tooth type. It is to be understood, however, that the sharpening device may be used on other types of saws.

The sharpening device 10 includes a yoke 14 having first and second guide fingers 16 and 18 threadedly attached to the ends of the leg portions 20 thereof for adjustment toward and away from each other. As will be appreciated the registering ends of the fingers are adapted to slidably and guidably receive the saw blade 12 therebetween, the fingers being locked in adjusted position by suitable lock nuts 22 which are threadedly mounted thereon and adapted to abut the leg portions of the yoke.

A spindle supporting hub 24 is formed integrally with the converging end portions 26 of a pair of L-shaped arms 28, which arms have the other end portions 30 thereof fixedly secured adjacent opposite ends of the web portion 32 of the yoke 14. Thus the hub is supported in spaced relation to the yoke 14, by the arms 28. A spindle supporting sleeve 34 is non-rotatably mounted in the hub 24, as by a set screw 36 and a spindle 38 is rotatably journaled in bearings 40 in the sleeve. In order to limit axial movement of the spindle relative to the sleeve, the former is provided with an annular recess 42 into which extends the screw 44 carried by the sleeve.

A collar 46 is carried by the spindle and spaced from one end thereof, and an abrading disk 48 is disposed on the spindle and interposed between a pair of washers 50 and 52, one of which washers 50 abuts the collar 46, and may, if desired, be formed integrally therewith. A locking nut 54 is provided to clamp the abrading disk and washer assembly on the spindle, as is clearly apparent from the drawings. As will be noted, the abrading disk is interposed between the yoke and the hub, and, by virtue of its position, is effectively shielded by the yoke 14 and arms 28. Additionally, the arm and yoke construction affords adequate support for the spindle and abrading element on the saw blade while permitting the operator to view the portion of the blade being worked upon as well as the working edge of the abrading element.

In order to facilitate manipulation of the device, one handle 56, having an enlarged end 58, is secured to the web portion 32 of the yoke, adjacent one end of the web portion so that gripping of the handle will not be obstructed by the saw blade which customarily extends medially between the leg portions 20. A second arcuate handle member 60 having a hand grip portion 62 is secured to the hub 24 and extends downwardly and rearwardly therefrom, as viewed in Figures 2 and 3.

It is contemplated that the spindle be driven by a flexible shaft 64 which includes a flexible sheath 66 and a cable 68 disposed in the sheath. One end of the sheath is coupled, as by the gland 70 to the sleeve 34, the cable 68 being coupled by the keyed connection 72 to the spindle 38. The other end 74 of the flexible cable is coupled in any suitable manner to a source of power.

Figure 2:
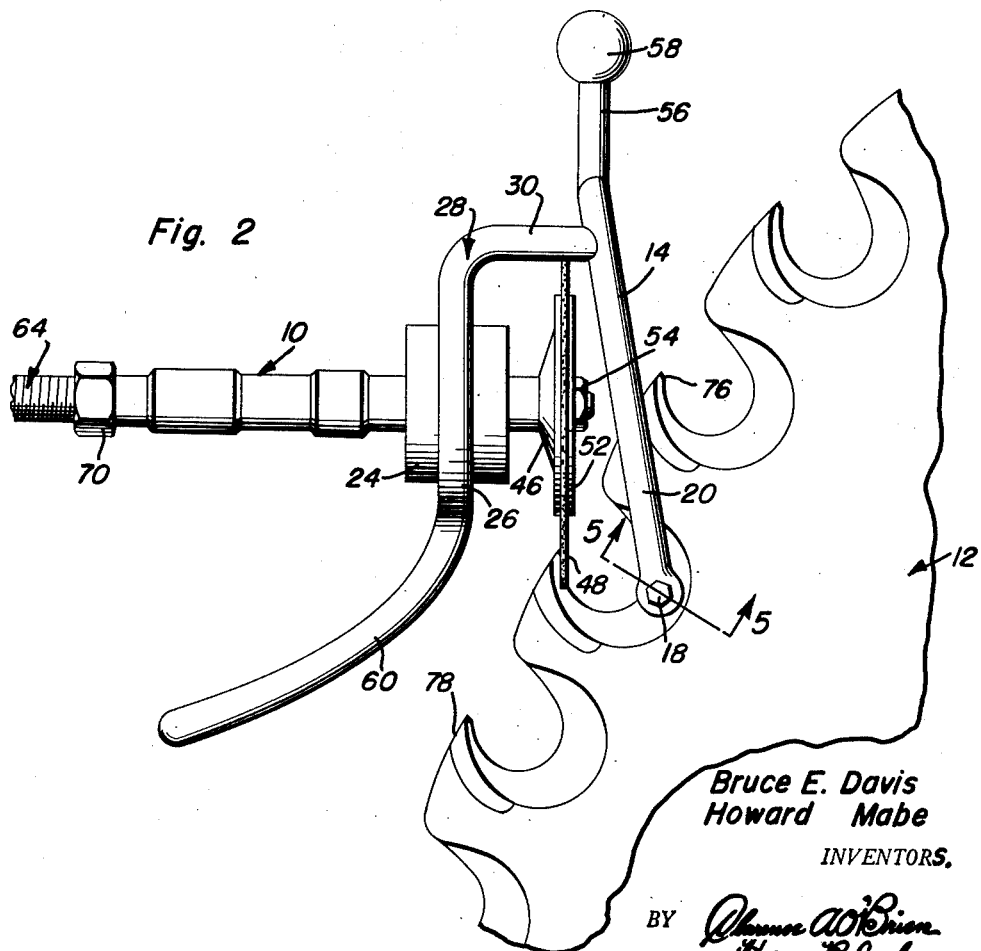
Figure 2 is a side elevational view of the sharpening device shown in operative position on a saw blade.

In utilizing the sharpening device the fingers 16 and 18 are adjusted so as to slidably and guidably receive the saw blade 12 therebetween. When gumming the saw, as shown in Figure 2, the face of the abrading disk 48 which registers with the hub 24 is utilized. Similarly, when facing the cutting edges 76 of the teeth on the saw, the sharpening device is merely shifted relative to the blade so that one of the faces thereof abuts the cutting edge of the saw teeth. Since the yoke 14 is guided on the saw blade, it will be appreciated that it constitutes a reactor arm for the sharpening device in addition to retaining the device properly oriented relative to the saw teeth. Obviously, the face of the disk 48 which registers with the yoke may be used to face the top 78 of the teeth.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. In a saw filing device, a U-shaped yoke, inwardly extending guide fingers on the ends of the legs of said yoke adapted to guidably receive a saw blade therebetween, a pair of L-shaped arms each having one leg thereof secured to said yoke adjacent the web portion thereof, a hub secured between the other legs of said arms, a sleeve extending through said hub and a spindle rotatably journaled in said sleeve, an abrading element on one end of said spindle between said hub and said yoke, and means for driving said spindle.

2. In a saw filing device, a U-shaped yoke, inwardly extending guide fingers on the ends of the legs of said yoke adapted to guidably receive a saw blade therebetween, a pair of L-shaped arms each having one leg thereof secured to said yoke adjacent the web portion thereof, a hub secured between the other legs of said arms, a sleeve extending through said hub and a spindle rotatably journaled in said sleeve, an abrading element on one end of said spindle between said hub and said yoke, a flexible cable including a drive shaft and a sheath therefor, means coupling said shaft to said spindle and said sheath to said sleeve.

3. In a saw filing device, a U-shaped yoke, inwardly extending guide fingers on the ends of the legs of said yoke adapted to guidably receive a saw blade therebetween, a pair of L-shaped arms each having one leg thereof secured to said yoke adjacent the web portion thereof, a hub secured between the other legs of said arms, a sleeve extending through said hub and a spindle rotatably journaled in said sleeve, an abrading element on one end of said spindle between said hub and said yoke, a flexible cable including a drive shaft and a sheath therefor, means coupling said shaft to said spindle and said sheath to said sleeve, a handle member on said hub extending in a direction away from said abrading element.

4. In a saw filing device, a U-shaped yoke, inwardly extending guide fingers on the ends of the legs of said yoke adapted to guidably receive a saw blade therebetween, a pair of L-shaped arms each having one leg thereof secured to said yoke adjacent the web portion thereof, a hub secured between the other legs of said arms, a sleeve extending through said hub and a spindle rotatably journaled in said sleeve, an abrading element on one end of said spindle between said hub and said yoke, a flexible cable including a drive shaft and a sheath therefor, means coupling said shaft to said spindle and said sheath to said sleeve, a handle grip on said yoke disposed in alignment with one of the legs thereof.

5. In a saw filing device, a U-shaped yoke, inwardly extending guide fingers on the ends of the legs of said yoke adapted to guidably receive a saw blade therebetween, a pair of L-shaped arms each having one leg thereof secured to said yoke adjacent the web portion thereof, a hub secured between the other legs of said arms, a sleeve extending through said hub and a spindle rotatably journaled in said sleeve, an abrading element on one end of said spindle between said hub and said yoke, a flexible cable including a drive shaft and a sheath therefor, means coupling said shaft to said spindle and said sheath to said sleeve, said guide fingers being adjustably mounted on the legs of said yoke for movement toward and away from each other.

BRUCE E. DAVIS.
HOWARD MABE.

References Cited in the file of this patent

UNITED STATES PATENTS

| Number | Name | Date |
|---|---|---|
| 128,553 | McBride | July 2, 1872 |
| 230,489 | Mudford | July 27, 1880 |
| 582,807 | Chaffin | May 18, 1897 |
| 1,942,016 | Andrus | Jan. 2, 1934 |
| 2,076,916 | Perkins | Apr. 13, 1937 |
| 2,249,743 | Bucknam | July 22, 1941 |

FOREIGN PATENTS

| Number | Country | Date |
|---|---|---|
| 3,018 | Great Britain | Feb. 6, 1911 |
| 159,784 | Germany | Apr. 26, 1905 |
| 670,747 | Germany | Jan. 26, 1939 |
| 683,348 | Germany | Nov. 4, 1939 |